F. GETTELMAN.
VEHICLE BRAKE.
APPLICATION FILED SEPT. 3, 1908.

930,371.

Patented Aug. 10, 1909.

Witnesses
George Felber
F. J. Muir

Inventor
Fredrick Gettelman
By Clement Young
Attorneys

UNITED STATES PATENT OFFICE.

FREDRICK GETTELMAN, OF MILWAUKEE, WISCONSIN.

VEHICLE-BRAKE.

No. 930,371.　　　　Specification of Letters Patent.　　　Patented Aug. 10, 1909.

Application filed September 8, 1908. Serial No. 451,468.

*To all whom it may concern:*

Be it known that I, FREDRICK GETTELMAN, a citizen of the United States, and resident of Milwaukee, in the county of Milwaukee and State of Wisconsin, have invented certain new and useful Improvements in Vehicle-Brakes; and I do hereby declare that the following is a full, clear, and exact description thereof.

The object of my invention is to provide a simple and effective brake for bicycles, motor-cycles or like vehicles, the arrangement and construction being such that a back-pedal motion sets a band-brake mechanism. This band-brake mechanism may, in some instances, be used in conjunction with any form of "coaster-brake" now in common use.

The invention therefore consists in various details of construction and combination of parts as hereinafter fully set forth with reference to the accompanying drawings and subsequently claimed.

Figure 1:
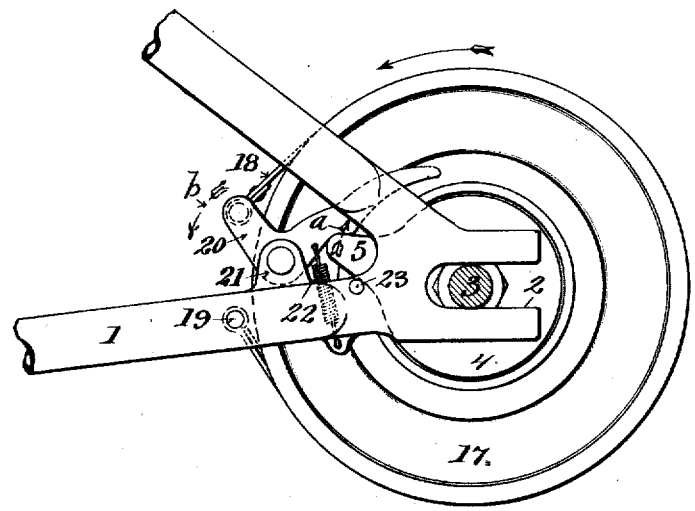
Figure 2:
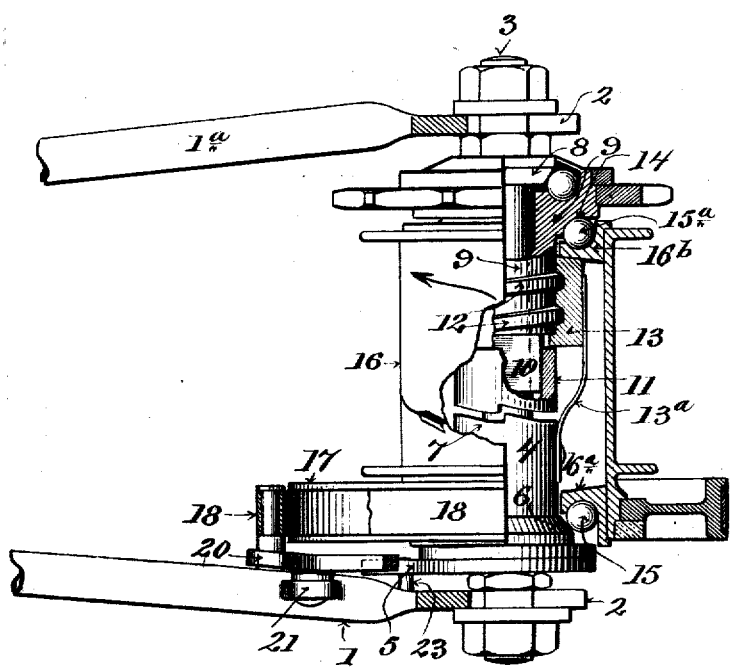

In the drawings: Figure 1 represents an elevation of a portion of the rear fork of a bicycle and a wheel-hub in connection therewith having attached thereto a brake embodying the features of my invention; and Fig. 2, a plan view of the same with parts broken away and parts in section to better illustrate the invention.

Referring by numerals to the drawings, 1, 1ª, indicate the rear fork of the frame of a bicycle or other vehicle, the fork being provided with slots 2 into which is secured an axle 3. Loosely mounted upon the axle is a sleeve 4 having a finger 5 extending therefrom adjacent to the fork 1, the sleeve being formed with a cone-bearing 6 and terminating at its inner end with a toothed clutch-face 7 constituting a clutch member. Adjacent the fork 1ª, the axle is provided with a cone-bearing 8, which in conjunction with a series of balls constitutes a bearing for a sprocket-carrying hub 9. The inner end of this hub is mounted upon the axle and has exterior flattened faces 10, over which faces is fitted a toothed clutch-member 11 having an aperture therein corresponding to the flattened faces of the hub-end. Back of its flattened end, the hub is provided with an exterior threaded portion 12 for engagement with a nut 13, which nut is frictionally engaged by a series of leaf-springs 13ª, that extend from and are secured to the sleeve 4, the inner end-face of the hub being adapted to contact with the slidable clutch-member 11. The hub 9 is also provided with an exterior ball-race 14, which in conjunction with the cone-bearing 6 of the sleeve 4 constitute seats for series of balls 15, 15ª, upon which balls a wheel-hub 16 has its bearings, the wheel-hub being provided with the usual ball-cups 16ª, 16ᵇ, at its ends.

Secured to the wheel-hub is a band-wheel 17, having a countersunk face into which is fitted a steel brake-band 18, one end of the band being secured to a stud 19 that projects from the fork 1. The opposite end of the band is secured to a lever 20, which lever is fulcrumed to an ear 21, also extending from the fork. The free end of this lever projects over and engages the finger 5 of the sleeve, the said free-end being held in its position by means of a coil-spring 22 secured thereto and also connected to the fork.

As shown in Fig. 1, when the parts are in their normal or running position, finger 5 rests upon a pin 23, which pin projects from the fork 1, the finger being held in its position by the spring-pressure exerted upon the lever. In order to produce a quick movement of the lever 20 when the finger 5 is actuated, the free end of said lever is preferably formed with an abrupt curved seat in which said finger rests, the lever thereafter terminating with a gradual curvature, against which the aforesaid finger acts to produce further movement of said lever, whereby final compression of the band is effected, after first taking up the slack therein by the abrupt curved seat. In some instances the finger 5 may also be provided with a spring similar to that shown in connection with the lever, in order to return said finger to its normal position of rest upon the pin 23.

When the wheel-hub is being propelled forward by the sprocket-wheel, as indicated by the arrow in Fig. 1, the nut 13 is forced against the wall of the ball-cup 16ᵇ, due to action of the threaded sleeve and consequently all parts are tightly clamped and will revolve together. A reverse movement of the sprocket, due to back-pedaling, will cause the nut to be forced forward by the action of the threads upon the hub. The nut in turn slides the clutch-member 11 into engagement with the toothed clutch-face of the sleeve. A further rotation of the sprocket-wheel in the reverse direction now causes the sleeve to turn, its finger 5 being moved in the direction as indicated by the dotted arrow a in Fig. 1. The lever 20 in consequence will rock in the direction, as indicated by the dotted arrow b, and set the band firmly against the band-wheel, thereby effecting a positive brake.

The leaf-springs 13ª which engage the nut serve as friction devices in connection with the sleeve, whereby said nut is under sufficient resistance to permit the threaded sleeve to move it back and forth as the case may require.

I claim:

In a vehicle-brake, a frame, an axle secured thereto, a cone-bearing secured adjacent to one end of the axle, a sprocket-wheel hub revolubly mounted upon said axle having oppositely disposed ball-races, a series of balls interposed between the cone and one of the hub ball-races, whereby end-thrust of the sprocket-wheel is opposed, a sleeve loosely mounted upon the aforesaid axle opposite its cone-bearing, the sleeve-hub being provided with a cone-bearing and exterior finger, sets of balls surrounding the sleeve cone-bearing and other ball-race of said sprocket-wheel hub, a wheel-hub provided with ball-cups mounted upon the sets of balls, exterior threads surrounding the sprocket-wheel hub, a nut engaging the threads, a leaf-spring secured to the sleeve, the free end of which is adapted to have frictional engagement with the outer face of the nut, a flat-faced end-section extending from the threaded portion of said wheel-hub, a toothed clutch-member slidably mounted upon the flat-faced end-section arranged to be engaged by the nut, a toothed face extending from the aforesaid sleeve for engagement with the slidable clutch-member, a band-wheel carried by the wheel-hub, a band fitted thereto, means connecting one end of the band and frame, and means connecting the opposite end of said band and exterior sleeve finger.

In testimony that I claim the foregoing I have hereunto set my hand at Milwaukee in the county of Milwaukee and State of Wisconsin in the presence of two witnesses.

FREDRICK GETTELMAN.

Witnesses:
GEORGE FELBER,
N. C. OLIPHANT.